United States Patent
Musser, Jr. et al.

(10) Patent No.: US 9,538,183 B2
(45) Date of Patent: Jan. 3, 2017

(54) AUDIO-VISUAL CONTENT DELIVERY WITH PARTIAL ENCODING OF CONTENT CHUNKS

(71) Applicant: Home Box Office, Inc., New York, NY (US)

(72) Inventors: Elmer Gehman Musser, Jr., St. James, NY (US); Hardys Christ Eggum, Muttontown, NY (US)

(73) Assignee: Home Box Office, Inc., New York, NY (US)

( * ) Notice: Subject to any disclaimer, the term of this patent is extended or adjusted under 35 U.S.C. 154(b) by 704 days.

(21) Appl. No.: 13/896,751

(22) Filed: May 17, 2013

(65) Prior Publication Data
US 2013/0308699 A1 Nov. 21, 2013

Related U.S. Application Data

(60) Provisional application No. 61/648,828, filed on May 18, 2012.

(51) Int. Cl.
*H04N 7/26* (2006.01)
*H04N 19/85* (2014.01)
(Continued)

(52) U.S. Cl.
CPC ........ *H04N 19/00903* (2013.01); *H04N 19/85* (2014.11); *H04N 21/222* (2013.01);
(Continued)

(58) Field of Classification Search
None
See application file for complete search history.

(56) References Cited

U.S. PATENT DOCUMENTS 5,870,754 A * 2/1999 Dimitrova ......... G06F 17/30799
5,949,490 A * 9/1999 Borgwardt ........... H04N 19/159
375/240.05
(Continued)

FOREIGN PATENT DOCUMENTS

CN 101267564 B 6/2011
CN 101977313 B 11/2012
(Continued)

OTHER PUBLICATIONS

International Preliminary Report on Patentability; Mailed Aug. 27, 2014 for the corresponding PCT Application No. PCT/ US2013/041603.
(Continued)

*Primary Examiner* — Joseph Ustaris
*Assistant Examiner* — Edemio Navas, Jr.
(74) *Attorney, Agent, or Firm* — Mendelsohn Dunleavy, P.C.; Edward J. Meisarosh; Steve Mendelsohn (57) ABSTRACT

In one embodiment, an edge server in a content-distribution network (CDN) stores a video asset in the form of partially encoded transport-stream chunks, where the partial encoding does not include quantization processing. When the edge server receives a request from a user device for a particular segment of the asset at a particular quality corresponding to a target bitrate, the edge server retrieves at least one partially encoded chunk corresponding to the request and completes the encoding (including quantization processing) of the at least one partially encoded chunk to generate an output file at the requested target bitrate. The edge server then adds corresponding audio data and any auxiliary data to the output file to generate a transport-stream file. The edge server then transmits the transport-stream to the user device as one or more transport-stream packets.

21 Claims, 3 Drawing Sheets

(51) Int. Cl.
*H04N 21/222* (2011.01)
*H04N 21/2343* (2011.01)
*H04N 21/845* (2011.01)

(52) U.S. Cl.
CPC .............. *H04N 21/23439* (2013.01); *H04N 21/234354* (2013.01); *H04N 21/8456* (2013.01)

(56) References Cited

U.S. PATENT DOCUMENTS

| | | | |
|---|---|---|---|
| 7,738,676 B1 * | 6/2010 | Evans | G06T 1/0035 382/100 |
| 8,311,115 B2 | 11/2012 | Gu et al. | |
| 2005/0102506 A1 * | 5/2005 | Pica | G06F 21/10 713/165 |
| 2006/0088105 A1 | 4/2006 | Shen et al. | |
| 2006/0184982 A1 | 8/2006 | Paz et al. | |
| 2006/0294128 A1 | 12/2006 | Gottschalk | |
| 2008/0201736 A1 * | 8/2008 | Gordon | H04N 7/17318 725/34 |
| 2009/0052323 A1 * | 2/2009 | Breynaert | H04N 21/23406 370/235 |
| 2009/0297126 A1 | 12/2009 | Cortes et al. | |
| 2010/0158098 A1 | 6/2010 | McSchooler et al. | |
| 2010/0189179 A1 | 7/2010 | Gu et al. | |
| 2011/0023080 A1 | 1/2011 | Drang et al. | |
| 2011/0087794 A1 * | 4/2011 | Li | H04N 5/765 709/231 |
| 2011/0126248 A1 | 5/2011 | Fisher et al. | |
| 2011/0188439 A1 | 8/2011 | Mao et al. | |
| 2012/0163452 A1 | 6/2012 | Horowitz | |
| 2012/0163453 A1 | 6/2012 | Horowitz | |
| 2012/0222063 A1 | 8/2012 | Mao et al. | |
| 2012/0230391 A1 | 9/2012 | Huang et al. | |
| 2012/0236940 A1 | 9/2012 | Katzur et al. | |
| 2013/0013803 A1 | 1/2013 | Bichot et al. | |

FOREIGN PATENT DOCUMENTS

| | | | | |
|---|---|---|---|---|
| WO | WO2006067373 A1 | 6/2006 | | |
| WO | WO 2010034020 A2 * | 3/2010 | ..... | H04N 21/234354 |
| WO | WO2010034020 A2 | 3/2010 | | |

OTHER PUBLICATIONS

Written Opinion; Mailed May 2, 2014 for related PCT Application No. PCT/US2013/041603.
International Search Report and Written Opinion; Mailed Aug. 29, 2013 for corresponding PCT Application No. PCT/US2013/041603.
Chang et al., "Efficient Segment-Based Video Transcoding Proxy for Mobile Multimedia Services," Journal of Systems Architecture, Elsevier, vol. 53, No. 11, Aug. 14, 2007, pp. 833-845.
Stockhammer, T., "Dynamic Adaptive Streaming Over HTTP—Design Principles and Standards," Proceedings of the Second Annual ACM Conference on Multimedia Systems, Feb. 23-25, 2011, San Jose, CA, USA, 3 pages.
"Wowza Media Server 3—Overview," Wowza Media Systems, Inc., Dec. 2011, retrieved from www.wowza.com.
Shafique, M., et al., "Optimizing the H.264/AVC Video Encoder Application Structure for Reconfigurable and Application-Specific Platforms," Journal of Signal Processing Systems, Aug. 2010, vol. 60, No. 2, pp. 183-210.
Richardson, I., "An overview of H.264 Advanced Video Coding," Technical Report, Vcodex Ltd, 2007, pp. 1-7.
Siglin, T., "Unifying Global Video Strategies: MP4 File Fragmentation for Broadcast, Mobile and Web Delivery," A Transitions in Technology White Paper, Nov. 16, 2011, pp. 1-16.
Rogge, M., et al., "Video in Commerce," Akamai Edge 2011 Customer Conference, Akamai, retrieved from http://wwwns.akamai.com/conference_2011/preso/Commercec%20-%20Enhancing%20Your%20Site%20with%20Video.pptx on May 16, 2012, 33 pages.
"Video Codec Basics," Video Codec Simplified, retrieved from www.drtonygeorge.com/video_codec.htm on May 16, 2012, pp. 1-4.
Ozer, J., "What is Encoding and Transcoding," Posted on Apr. 20, 2011 in Streaming Media Magazine, retrieved from www.streamingmedia.com/Articles/Editorial/What-ls-.../What-is-Encoding-and-Transcoding-75025.aspx on May 16, 2012, pp. 1-4.
"HTTP Adaptive Streaming: Using the Edgeware Video Delivery Appliances," Whitepaper, Edgeware, Retrievable from http://info.edgeware.tv/http-adaptive-streaming, 2010, pp. 1-13.

* cited by examiner

AUDIO-VISUAL CONTENT DELIVERY WITH PARTIAL ENCODING OF CONTENT CHUNKS

This application claims the benefit of the filing date of U.S. Provisional Application No. 61/648,828 filed on May 18, 2012, the teachings of which are incorporated herein by reference in their entirety.

BACKGROUND

Field

The current disclosure relates to audio-visual (AV) content delivery, and more specifically, but not exclusively, to AV content delivery using a packet-switched network.

Description of the Related Art

Audio-visual (AV) content, in the form of digital data, may be delivered to consumers using content delivery networks (CDNs). A typical CDN uses a packet-switched network, such as the Internet, to deliver encoded AV content from an origin server to a large group of user devices via a collection of edge servers, each of which is typically located proximately to a subgroup of the user devices. User devices include players configured to decode received digital audio-visual content. A typical CDN comprises an origin server and a plurality of edge servers. Each edge server is connected to one or more different types of end-user devices, such as, for example, set-top boxes (STBs), desktops, laptops, tablets, smart phones, and cellular phones.

AV content items, also known as assets, are created in an original high-resolution format—such as, for example, AVCHD (Advanced Video Coding High Definition) or AVC-Intra—that typically stores information about each of the frames in the asset with only limited, if any, compression, in order to preserve a maximal amount of information. The original-format asset may be further compressed to generate a high-resolution mezzanine lossy intermediate file of a smaller size than the original-format asset. Common standards for additional compression are ProRes 422, JPEG2000, and long GOP MPEG-2 (H.222/H.262 as defined by the ITU).

The mezzanine lossy intermediate file is then commonly compressed again for end user devices. A common final compression format is part 10 of the MPEG-4 suite, known as H.264 or AVC (advanced video coding). H.264 defines an improved compression process that, compared with older standards, allows for (i) a higher-quality AV segment at the same bitrate or (ii) the same quality AV segment at a lower bitrate.

The H.264 standard is computationally more intensive relative to older standards and allows for encoding a relatively more-compressed version of an AV file. The compression uses multiple techniques that are based on the way moving pictures are structured—having, for example, typically a lot of similarity between neighboring sections of a single frame and between consecutive frames—and the way moving pictures are perceived by humans—with, for example, greater sensitivity to changes in brightness than changes in color (in other words, a greater sensitivity to luminance than to chromaticity). The result of this H.264 encoding can be stored in a defined standard containers such as MP4 (MPEG-4 part 14) or MOV (QuickTime File Format; QuickTime is a registered trademark of Apple Inc. of Cupertino, Calif.). End user devices typically download the final compressed H.264 encoded video and compressed audio in chunked segments of the MP4 container. The chunked segments are defined by standards such as Smooth Streaming (using ISM files), HTTP Live Streaming (HLS), and HTTP Dynamic Streaming (HDS), and referred to in this application as transport-stream files. One common file type for transport-stream files, which are used in the user segment, is the .ts file type. A mezzanine intermediate file may be transcoded into a myriad different corresponding transport-stream files of various quality levels. As noted above, a CDN serves different types of user devices. These devices may have different types of media-playing programs on them and the devices may have data connections of different bandwidths to their respective edge servers. Consequently, a user device requesting an asset specifies a particular format, resolution, and/or bitrate (or bitrate range).

In order to be ready to provide the asset to a variety of devices, running a variety of client media-playing programs, at a variety of resolutions and bitrates, multiple versions of the asset are created. Each different version requires a corresponding transcoding of the mezzanine intermediate file into transport-stream files. The origin server stores multiple transport-stream versions of the asset, where the different versions, in the form of different transport-stream files, have different encoding formats, resolutions, and/or bitrates. Multiple versions of the same asset are needed for compatibility with a wide range of user-device types, client programs, and data-transmission rates. These different multiple versions are stored at the origin server.

When a user device requests a particular asset from its corresponding edge server, one or more compatible transport-stream files—corresponding to, for example, different bitrates—are transmitted by the origin server to the edge server for caching at the edge server. The particular versions depend on factors such as (a) the device type of the user device, (b) the user device's client program that requested the asset, and (c) the available bandwidth of the connection between the user device and the edge server. The edge server caches the entirety of the received transmission-ready version of the requested item and streams it to the user device for presentation to a user.

The above-described system requires both the generation, transport, and storage of a large number of versions of every asset that is to be readily available to users.

SUMMARY

One embodiment of the disclosure can be a computer-implemented method comprising storing a set of preprocessed video chunks at an edge server of a content delivery network (CDN), wherein the preprocessed video chunks result from partial encoding of corresponding segments of a video asset, the partial encoding does not include quantization processing, and the edge server connects to a user device. The method further comprises receiving, by the edge server, a request from the user device for a segment of the video asset at a first target quality level, then retrieving, by the edge server, from the set of preprocessed video chunks, at least one preprocessed video chunk corresponding to the requested segment. The method further comprises then performing, by the edge server, final processing of the at least one preprocessed video chunk, wherein the final processing completes the encoding of the at least one preprocessed video chunk and includes quantization processing, and the final processing generates a corresponding first transport-stream file at the first target quality level. The method further comprises then providing, by the edge server, the first transport-stream file to the user device.

Another embodiment of the disclosure can be an edge server comprising a processor and a memory, the edge server configured to (i) operate as part of a content delivery network (CDN) and (ii) connect to a set of one or more user devices including a first user device, wherein the processor is configured to store a set of preprocessed video chunks into the memory, wherein the preprocessed video chunks result from partial encoding of corresponding segments of a video asset and the partial encoding does not include quantization processing. The processor is further configured to receive a request from the first user device for a segment of the video asset at a target quality level, then retrieve from the memory at least one preprocessed video chunk corresponding to the requested segment from the set of preprocessed video chunks, and then perform final processing of the at least one preprocessed video chunk, wherein the final processing completes the encoding of the at least one preprocessed video chunk and includes quantization processing, and the final processing generates a corresponding first transport-stream file at the target quality level. The processor is further configured to then provide the first transport-stream file to the first user device.

Yet another embodiment of the disclosure can be an origin server configured to (a) operate as part of a content delivery network (CDN), (b) connect to a plurality of edge servers including a first edge server, (c) preprocess a video asset, wherein the preprocessing comprises partial encoding of segments of the video asset that generates corresponding preprocessed video chunks and the partial encoding does not include quantization processing, (d) store the preprocessed video chunks, and (e) provide one or more preprocessed video chunks to the first edge server.

BRIEF DESCRIPTION OF THE DRAWINGS

Other aspects, features, and advantages of the disclosure will become more fully apparent from the following detailed description, the appended claims, and the accompanying drawings in which like reference numerals identify similar or identical elements.

DETAILED DESCRIPTION

A mezzanine intermediate file may be organized as a series of consecutive fixed-duration segments known as chunks. Note that consecutive chunks may have different durations. Chunks are typically between one and ten seconds in duration. Chunks are typically the units used in requests for, and transmission of, the asset. Each chunk typically comprises one or more Groups of Pictures (GoPs), where a GoP may be decoded independently of other GoPs. A typical GoP starts with an initial reference frame, and encodes a plurality of subsequent frames as differences from previous and/or subsequent frames. Note that, since many times a chunk consists of a single GoP, the terms chunk and GoP may sometimes be used interchangeably.

Novel CDN systems, described below, involve pre-processing chunks of mezzanine files for more-efficient CDN operation. The pre-processed chunks may be considered partially encoded transport-stream files. The pre-processed chunks allow for on the fly, just in time, generation of corresponding transport-stream files by an edge server in response to requests by connected user devices.

Figure 1:
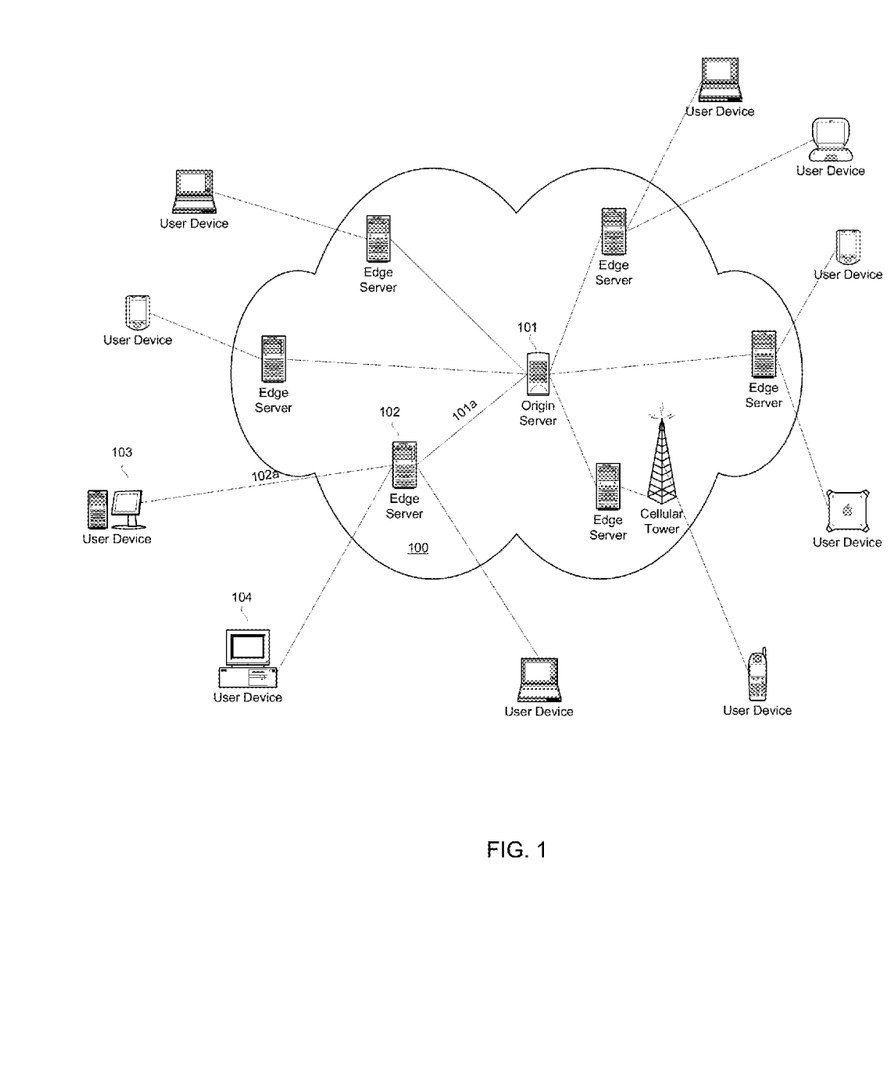
FIG. 1 shows a simplified block diagram of an exemplary CDN in accordance with one embodiment of the invention.

FIG. 1 shows exemplary CDN 100, which includes origin server 101 connected to several edge servers, including edge server 102. Each edge server may be connected to one or more different types of end-user devices, such as, for example, set-top boxes (STBs), desktops, laptops, tablets, smart phones, and cellular phones. Edge server 102 is connected to user devices 103 and 104. The connection from an edge server to a particular user device might be wired, wireless, or a combination of the two. Wireless connections may be established, for example, using WiFi or cellular technology.

As described above, a user device requests a chunk of an asset—at a particular resolution and quality level, where quality level generally corresponds to bitrate—from its corresponding edge server and, in turn, the edge server responds with a corresponding transport-stream file. Generally, transport streams of higher bit rates are used with devices having higher-resolution screens and/or faster data connections. Below are descriptions of exemplary operations of CDN 100 in the delivery of an asset in response to requests by user device 103 for an asset that is stored at origin server 101.

In accordance with one embodiment of the disclosure, a pre-processed mezzanine file is used for improved subsequent conversion into transport-stream packets. Pre-processed mezzanine files, which may be considered partially encoded transport-stream files, are prepared ahead of time and stored at origin server 101. If a user requests a particular asset, then the pre-processed and segmented mezzanine version of the asset is stored at its corresponding edge server. Note that the mezzanine file may already be cached at the edge server or the mezzanine file may be copied from the origin server, in response to the user request. Note that the edge server may pipeline an asset, where the edge server downloads subsequent chunks of the mezzanine-file version of an asset from the origin server while simultaneously transmitting earlier chunks of the transmission-stream-file version of that asset to the user device.

The user device may make requests for content one chunk at a time. The piecemeal requesting allows the user device to adjust the quality of the requested chunk based on changing bandwidth availability or other environmental variables. In addition, the piecemeal requesting allows the user device to more-easily provide trick play functionality, such as seek play (i.e., moving to any point of the asset for playback).

When instructed, the edge server performs just-in-time (JIT) media encoding of a pre-processed mezzanine-file chunk to generate a corresponding transport-stream chunk in a requested format at a requested quality level, where the chunk also includes any corresponding audio and auxiliary data (e.g., closed captioning). Typically used quality levels include 300, 600, 1200, 2000, and 3000 kbps. The edge server then generates one or more transport-stream chunks for provision to the user device via a packet-switched network, such as the Internet.

Figure 2:
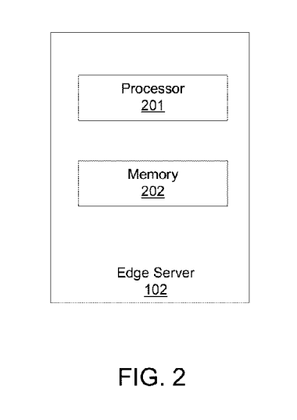
FIG. 2 shows a simplified block diagram of an edge server of FIG. 1 in accordance with one embodiment of the disclosure.

FIG. 2 shows a simplified block diagram of edge server 102 of FIG. 1 in accordance with one embodiment of the disclosure. Edge server 102 comprises parallel processor 201 connected to memory 202. Edge server 102 also includes communication ports (not shown) for communicating with other network devices, such as servers and user devices. Processor 201 performs computational, processing, and communication functions for edge server 102. Memory 202 includes both operational memory (not shown) for operational use by processor 201 and nonvolatile memory (not shown) for longer-term storage of data such as media assets. Processor 201 is a multi-core parallel processor comprising m cores (not shown) capable of performing m independent tasks in parallel. The m cores may be arranged to operate as an n*n array of cores.

Figure 3:
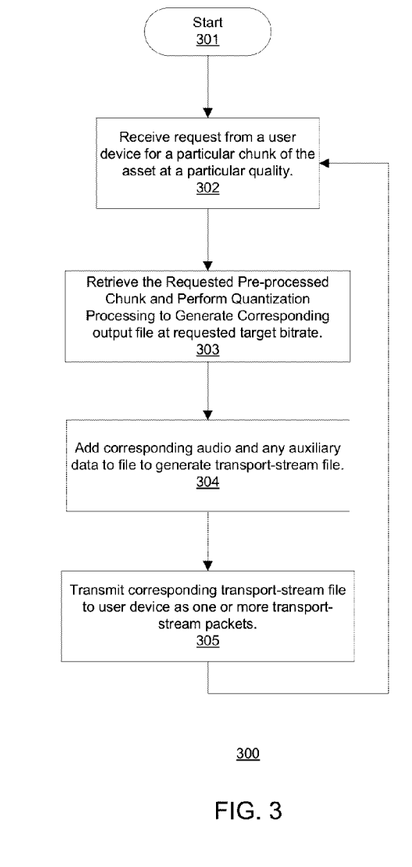
FIG. 3 shows a flowchart for processing and delivering an asset by the edge server of FIG. 2 in accordance with one embodiment of the disclosure.

FIG. 3 shows flowchart 300 for processing and delivering an asset to a user device by edge server 102 of FIG. 2, in accordance with one embodiment of the disclosure. Before the process starts (step 301), a segmented, preprocessed mezzanine-file version of the asset is stored at edge server 102, where the asset is segmented into g preprocessed chunks, where g is a positive integer. The preprocessed mezzanine file version may be generated, for example, by an origin server, such as origin server 101 of FIG. 1, by an intermediary or other server (not shown), or by edge server 102. The preprocessed mezzanine file is generated from an original-format file by analyzing the image frames of the original-format files, segmenting them into groups of pictures (GoPs), generating corresponding compressed versions of the GoPs, and generating the g preprocessed chunks of the mezzanine file.

For frames of a GoP, the processing may include dividing each frame into macro blocks and using motion estimation, motion compensation, and discrete cosine transforms (DCT) to create a compressed chunk that can be used to recreate the corresponding original-format multi-frame chunk (if using a lossless compression algorithm) or a close approximation (if using a lossy compression algorithm). Audio and auxiliary data—such as closed captioning—may also be compressed and may be stored in separate corresponding segments or may be integrated with the video data. The preprocessing performs some of the steps of generating a transport-stream file, but not including the quantization processing that determines the quality level of the resultant transport-stream file. In other words, the preprocessing generates partially encoded transport stream chunks that include the set of un-quantized coefficients that are the output of the DCT step.

Quantization processing quantizes the set of coefficients from the DCT step in order to increase the number of zero coefficients in the set. The degree of quantization is determined by a quantization parameter (QP), where the higher the QP the higher the compression and the lower the playback quality. As a result, the QP determines the size of the output bit stream and the quality level of the chunk during playback.

The above-described pre-processing (or partial encoding) means that when a request is received from a user device for a particular chunk of the asset at a particular target bitrate (step 302), the generation of a corresponding transport-stream file at the requested bitrate can be made rapidly on the fly, just in time (JIT) since much of the computational processing for generating an appropriate transport-stream file has been done ahead of time.

The generation of the corresponding transport-stream file by edge server 102 includes retrieving the requested mezzanine-file chunk, which has been pre-processed as described above, and performing quantization processing on the chunk to generate a corresponding output file at the requested target bitrate (step 303). The corresponding audio (either compressed or passed through) and any auxiliary data (e.g., closed captions) are added to the encoded chunk to generate the corresponding transport-stream file (step 304). Note that the audio and auxiliary data may be stored in segments corresponding to, for example, GoPs or chunks of the video data. The transport-stream file is then transmitted to the requesting user device using one or more transport-stream packets (step 305). The procedure then returns to await another request from the user device (step 302). The procedure may be terminated or suspended (not shown) at any point by either the edge server or the user device. Note that steps 302-305 may be implemented to, for example, transmit (i) an entire asset to one viewer at time-varying levels of quality, (ii) the same entire asset to a second user at a different time and at different time-varying levels of quality, and (iii) only portions of the asset to a third user at different again time-varying levels of quality.

Edge server 102 of FIG. 2 may allot a particular core—or set of cores—of processor 201 for each corresponding user device that edge server 102 is connected to, wherein a plurality of cores of processor 201 may simultaneously perform independent instances of the procedure described by flowchart 300 of FIG. 3. For example, edge server 102 may be connected to, and providing content to, twenty user devices using twenty corresponding cores of processor 201. Note that, if a plurality of user devices are accessing the same asset, then only one copy of the preprocessed mezzanine file of that asset need be stored at edge server 102.

In one embodiment of the disclosure, the m cores of processor 201 of edge server 102 of FIG. 2 may be used to simultaneously generate m transport-stream files at a requested quality level for up to m different chunks of a single asset. This parallel processing of the chunks of the preprocessed mezzanine file allows for the rapid generation of a streaming-ready—at a particular quality level—version of the asset. The generation of a streaming-ready file version of an asset may be performed faster than real time. In other words, the generation may be performed in less time than the duration of the asset. So, for example, a 30-minute asset may have a corresponding streaming-ready file (or set of files) at a particular quality level generated in 1 minute. The processing may include the addition of tag information to the transport-stream files that, for example, identifies a user requesting the asset or includes digital-rights-management information for the asset.

In one embodiment of the disclosure, the m cores of processor 201 of edge server 102 may be used to simultaneously generate a plurality of transport-stream files at a corresponding plurality of different quality levels for one or more different chunks of a single asset. So, for example, a 100-core processor could generate, in parallel, 10 corresponding transport-stream files at ten different quality levels for 10 different chunks of a segmented mezzanine file. The processing may include the addition of tag information to the transport-stream files.

In one embodiment of the disclosure, processor 201 of edge server 102 of FIG. 2 may be used in a multi-pass variable bitrate (VBR) process to generate transport-stream files from a mezzanine file of an asset. VBR encoding allows different chunks of a single stream to be encoded at different bitrates so that relatively complex chunks of the stream may be encoded with more data and relatively simple chunks of the stream may be encoded with less data. This allows for a more-efficient use of storage space and transmission bandwidth than constant bitrate (CBR) encoding. A VBR output stream is typically constrained by a bitrate range (maximum and/or minimum bitrate) or an average bitrate. In a standard VBR encoding procedure, an asset is first processed one or more times to analyze the content of the asset and determine an encoding strategy for the asset chunks based on the analysis. The asset is then processed in its entirety again to generate transport-stream output files at variable bitrates in accordance with the determined encoding strategy.

Figure 4:
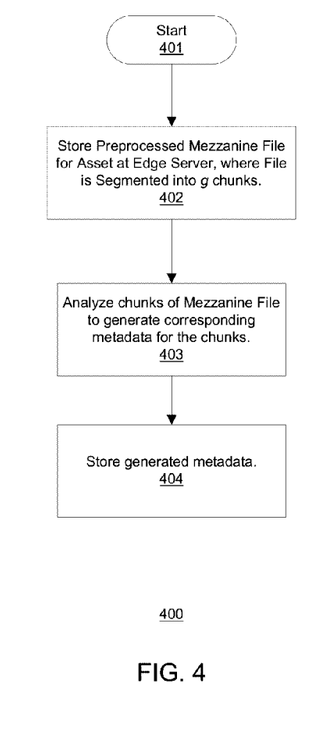
FIG. 4 shows a flowchart for an exemplary process in accordance with one embodiment of the disclosure.

FIG. 4 shows flowchart 400 for an exemplary process in accordance with one embodiment of the disclosure. In process 400, processor 201 performs the initial part of a multi-pass VBR processing, in parallel, for multiple chunks of an asset. After the processor starts (step 401), the preprocessed mezzanine file version of the asset is stored by edge server 102, segmented into g chunks (step 402). Processor 201 analyzes up to m chunks of the mezzanine file at a time in parallel to generate corresponding metadata for each chunk (step 403). If, for example, an asset is segmented into 1000 chunks and m equals 100, then step 403 would be repeated ten times. Then, after all chunks of the mezzanine file are analyzed, the generated metadata is stored by edge server 102 (step 404). Corresponding transport-stream files may be later generated in real time in response to user requests for the corresponding chunks. Alternatively, processor 201 may process up to m chunks of the mezzanine file at a time in parallel, each in accordance with the previously generated metadata, to generate corresponding transport-stream files for later transmission to users, encoded at variable bitrates. The processing may include the addition of tag information to the transport-stream files.

In one embodiment, edge server 102 of FIG. 2 responds to requests for chunks by a user device, where the chunks are requested at any one of a predefined set of bitrates. The predefined set of bitrates may be considered steps so that the user device can step up or step down the streaming bitrate in response to changing environmental conditions. Edge server 102 responds to the request by generating a corresponding transport-stream file just in time and on the fly from the corresponding chunk of a stored mezzanine file. One implementation of this embodiment uses dynamic adaptive streaming over HTTP (DASH), where a user device makes requests for content one chunk at a time, with each request specifying a particular bitrate that may be based on environmental variables such as, for example, (1) bandwidth presently available to the user device, (2) current fullness of the user device's buffer or (3) limits to keep usage within prescribed limits (for example, to stay within the bounds of a user's limited-download data plan). Some exemplary typical standard bitrates used in DASH systems are 300 kb/s, 600 kb/s, 1 Mb/s, and 1.3 Mb/s.

Figure 5:
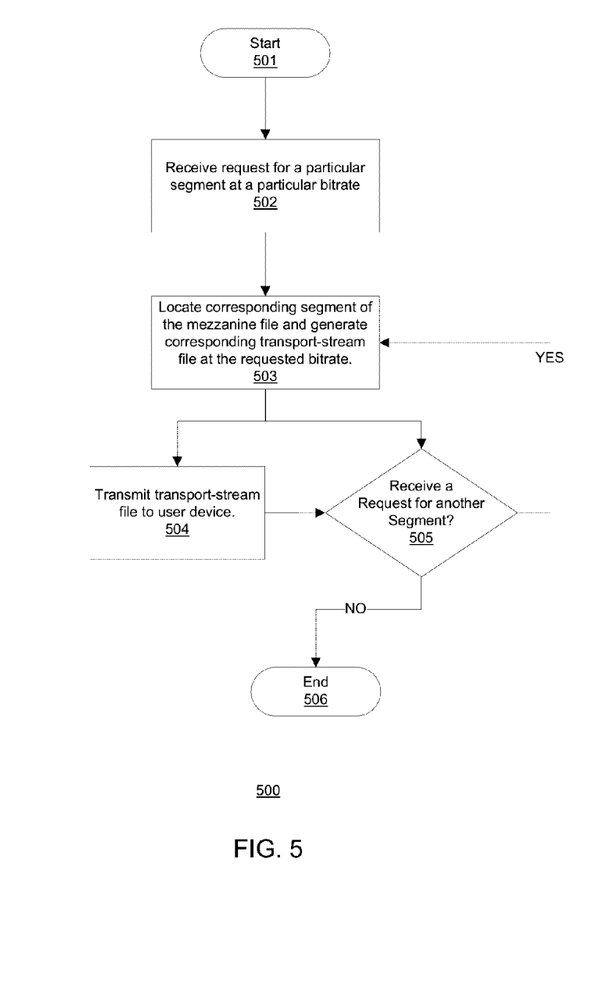
FIG. 5 shows a flowchart for an exemplary process in accordance with another embodiment of the disclosure.

FIG. 5 shows flowchart 500 for an exemplary process in accordance with one embodiment of the disclosure. After process 500 starts (step 501), edge server 102 receives a request from a user device for a particular chunk at a particular bitrate (step 502). Note that flowchart 500 shows the process after the relevant mezzanine file is already stored at edge server 102. If the mezzanine file version of the requested asset is not already saved at edge sever 102, then edge server 102 would first need to generate or download the mezzanine file. In response to the request from the user device, edge server 102 locates the corresponding chunk in the mezzanine file and generates a corresponding transport-stream file at the requested bitrate, as described above (step 503). The transport-stream file is then transmitted to the requesting user device (step 504).

At any time during this process, edge server 102 may receive another request for another chunk of an asset at a particular bitrate (step 505)—such as, for example, the next consecutive chunk of the asset—and edge server 102 may respond by immediately locating and starting to process the newly requested chunk at the requested bitrate (step 503)—all while edge server 102 may be transmitting or still processing the previous chunk (steps 503 and 504). If no new requests for chunks are received (step 505), then the process terminates (step 506). Note that a user device may request a next consecutive chunk of an asset at a bitrate lower than, the same as, or higher than, the immediately prior chunk, as described above.

It should be noted that the processing of a chunk may be done faster than real time. In other words, a chunk whose duration is t seconds may be processed in y seconds, where y<t. For example, edge server 102 may generate a 90-second transport-stream file from a 90-second mezzanine-file chunk in 60 seconds. This allows for continuous pipeline processing and streaming of content to the user device in response to requests without interruptions, pauses, stutters, or other similar annoyances to the user.

In one embodiment, features of flowcharts 400 of FIGS. 4 and 500 of FIG. 5 are combined, where the just-in-time processing of user requests is performed using VBR metadata for the requested chunk. In one exemplary implementation, the steps of flowchart 400 are performed so that the generated VBR metadata is stored by edge server 102 of FIG. 2. When a particular chunk of the asset is requested by a user, edge server 102 commences the process represented by flowchart 500 of FIG. 5. In other words, upon receipt by edge server 102 of a request from the user device for a particular chunk at a particular bitrate, edge server 102 locates the corresponding chunk of the preprocessed mezzanine file and its corresponding metadata and generates a corresponding transport-stream file at the requested bitrate, which is then transmitted to the user device. At the same time, other requests from the same user device or other user devices may be simultaneously handled by other cores of processor 201 of edge server 102. Note that the VBR metadata may be stored as part of the corresponding preprocessed mezzanine-file chunk or may be stored in another file or form that maintains the correspondence relationship between metadata and the corresponding chunk.

In one embodiment of the disclosure, a user device may request a chunk at any bitrate, and edge server 102 of FIG. 2 may provide the requested chunk at that bitrate. In other words, in this embodiment, the bitrates are dynamically variable—rather than being predefined. The user device requests a chunk at a bitrate determined in real time by a combination of environmental factors, as described above in reference to FIG. 4. The dynamic variability of the requested bitrate allows for more-optimal matching of the quality level of chunks requested for download to the download bandwidth available to the user device. Edge server 102, in turn, responds to the requests, as shown in FIG. 5, by generating—on the fly and just in time—a corresponding transport-stream file for transmission to the user device. As described above, the generation of the transport-stream file comprises performing quantization processing—and completing encoding—for the preprocessed—in other words, partially encoded—chunk. The quantization parameter is selected so as to have the output bitrate approximate the requested bitrate. Note that, in any particular implementation, the dynamically variable bitrates may be bounded within a range of available bitrates and may have limited resolution. In other words, in one exemplary implementation, a user device may request a chunk at any bitrate between 100 kb/s and 5 Mb/s in 1 kb/s increments.

In one embodiment, which may be combined with any of the above-described embodiments, edge server 102 of FIG. 2 adds a watermark to the transport-stream files provided to user devices. The watermark may be added to the video segment, to the corresponding audio segment, or to a corresponding data segment. The watermark may be a forensic watermark and may be visible, invisible, audible, or inaudible. Forensic watermarks are used to identify content creators, intended recipients, and/or other relevant information for the asset. In one implementation, a transport-stream file generated on the fly by server 102 in response to a request from a user device identifies the requesting user device in a watermark included in the transport-stream file. The watermark may also include other information, such as an authentication code or a time stamp. In one implementation, a transport-stream file generated by edge server 102 identifies edge server 102, the relevant CDN, and/or another element associated with the content provider. A particular user device may operate to verify—by inspecting watermarks in content to be played—that the content to be played was intended for that user device. The user device may take action—such as disabling play of the content or alerting the content provider—if the content to be played is watermarked so as to indicate that the content was not intended for the user device. Watermarks may also be used for tracking of the video and/or audio playing at the individual user device level.

It should be noted that, unless otherwise indicated or impossible, features of the above-described embodiments and implementations may be combined with one or more features of one or more other of the above-described embodiments and implementations.

Embodiments of the disclosure have been described referring to corresponding chunks. Note that chunks of an asset may be identified for the purpose of determining correspondence by for example, a sequential number identifier or a timecode.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

As used herein, the term "cache" and its variants refer to a dynamic computer memory that is preferably (i) high-speed and (ii) configured to have its present contents repeatedly overwritten with new data. To cache particular data, an entity can have a copy of that data stored in a determined location, or the entity can be made aware of the memory location where a copy of that data is already stored. Freeing a section of cached memory allows that section to be overwritten, making that section available for subsequent writing, but does not require erasing or changing the contents of that section.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The term "nonvolatile memory," as used herein, refers to any type of memory that substantially retains its stored contents after disconnection from its power supply, i.e., the stored contents can be retrieved after reconnecting the nonvolatile memory to a power supply. Examples of nonvolatile memory include, but are not necessarily limited to (i) fuse/antifuse devices such as OTP memory and PROM, (ii) charge-storing devices such as EPROM and EEPROM and flash ROM, (iii) magnetic media devices such as hard drives and tapes, and (iv) optical, opto-electrical, and opto-magnetic media such as CDs and DVDs.

The present invention may be implemented as circuit-based systems, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values stored in a non-transitory recording medium generated using a method and/or an apparatus of the present invention.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A computer-implemented method comprising:
    (a) storing a set of preprocessed video chunks at an edge server of a content delivery network (CDN), wherein:
        the preprocessed video chunks result from partial encoding of corresponding segments of a video asset;
        the partial encoding includes performing discrete cosine transform (DCT) functions to generate the preprocessed video chunks;
        the partial encoding does not include quantization processing; and
        the edge server connects to a user device;
    (b) receiving, by the edge server, a request from the user device for a segment of the video asset at a first target quality level;
    (c) then retrieving, by the edge server, from the set of preprocessed video chunks, at least one preprocessed video chunk corresponding to the requested segment;
    (d) then performing, by the edge server, final processing of the at least one preprocessed video chunk, wherein:
        the final processing completes the encoding of the at least one preprocessed video chunk and includes quantization processing; and
        the final processing generates a corresponding first transport-stream file at the first target quality level; and
    (e) then providing, by the edge server, the first transport-stream file to the user device.

2. The method of claim 1, further comprising, prior to the storing of the set of preprocessed video chunks, preprocessing the video asset to generate the set of preprocessed video chunks.

3. The method of claim 2, wherein:
the CDN further comprises an origin server connected to the edge server;
the origin server performs the preprocessing of the video asset; and
the origin server provides the set of preprocessed video chunks to the edge server.

4. The method of claim 3, wherein the origin server provides the set of preprocessed video chunks to the edge server in response to the edge server receiving the request from the user device for the segment of the video asset.

5. The method of claim 2, wherein the preprocessing comprises generating metadata for variable bitrate (VBR) encoding based on at least one of a defined average bitrate and a defined maximum bitrate.

6. The method of claim 1, further comprising storing metadata corresponding to the preprocessed video chunks, the metadata comprising encoding strategy information for variable bitrate (VBR) encoding, wherein the final processing uses the stored metadata in completing the encoding.

7. The method of claim 1, wherein:
any audio data and any auxiliary data of the video asset are segmented into segments matching corresponding preprocessed video chunks; and
the edge server stores the matching segments of any audio data and any auxiliary data.

8. The method of claim 7, wherein the final processing comprises combining preprocessed video chunks with corresponding segments of any audio data and any auxiliary data.

9. The method of claim 1, wherein:
each transport-stream file comprises at least one group of pictures (GoP); and
the GoP represents a closed set of video frames that may be decoded by the user device without additional information.

10. The method of claim 1, wherein:
the edge server comprises a plurality of processors configured to operate in parallel; and
each of the plurality of processors is configured to independently and simultaneously perform the final processing of a respective preprocessed video chunk at a respective target quality level.

11. The method of claim 1, wherein the target quality level is represented by a data rate.

12. The method of claim 1, further comprising:
receiving, by the edge server, a second request from the user device for a second segment of the video asset at a second target quality level different from the first target quality level;
then retrieving, by the edge server, at least one preprocessed video chunk corresponding to the requested second segment;
then performing, by the edge server, final processing of the at least one preprocessed video chunk corresponding to the requested second segment, wherein:
the final processing completes the encoding of the at least one preprocessed video chunk and includes quantization processing; and
the final processing generates a corresponding second transport-stream file at the second target quality level; and
then providing, by the edge server, the second transport-stream file to the user device.

13. The method of claim 12, wherein the edge server receives the second request from the user device before the edge server completes providing the first transport-stream file to the user device.

14. The method of claim 1, wherein the final processing includes adding at least one of a video watermark and an audio watermark to the first transport-stream file.

15. The method of claim 14, wherein the at least one of the video watermark and the audio watermark identifies the user device.

16. The method of claim 15, further comprising:
receiving, by the edge server, a second request from a second user device different from the user device for a second segment of the video asset at a second target quality level different from the first target quality level;
then retrieving, by the edge server, at least one preprocessed video chunk corresponding to the requested second segment;
then performing, by the edge server, final processing of the at least one preprocessed video chunk corresponding to the requested second segment, wherein:
the final processing completes the encoding of the at least one preprocessed video chunk and includes quantization processing;
the final processing generates a corresponding second transport-stream file at the second target quality level;
the final processing includes adding at least one of a second video watermark and a second audio watermark to the second transport-stream file; and
the at least one of the second video watermark and the second audio watermark identifies the second user device; and
then providing, by the edge server, the second transport-stream file to the user device.

17. An edge server comprising a processor and a memory, the edge server configured to (i) operate as part of a content delivery network (CDN) and (ii) connect to a set of one or more user devices including a first user device, wherein the processor is configured to:
(a) store a set of preprocessed video chunks into the memory, wherein:
the preprocessed video chunks result from partial encoding of corresponding segments of a video asset;
the partial encoding includes performing discrete cosine transform (DCT) functions to generate the preprocessed video chunks; and
the partial encoding does not include quantization processing;
(b) receive a request from the first user device for a segment of the video asset at a target quality level;
(c) then retrieve from the memory at least one preprocessed video chunk corresponding to the requested segment from the set of preprocessed video chunks;
(d) then perform final processing of the at least one preprocessed video chunk, wherein:
the final processing does not include the partial encoding;
the final processing completes the encoding of the at least one preprocessed video chunk and includes quantization processing; and
the final processing generates a corresponding first transport-stream file at the target quality level; and
(e) then provide the first transport-stream file to the first user device.

18. The edge server of claim 17, wherein:
the processor comprises a plurality of processors configured to operate in parallel; and
each of the plurality of processors is configured to independently and simultaneously perform the final processing of a respective preprocessed video chunk at a respective target quality level.

19. An origin server configured to:
(a) operate as part of a content delivery network (CDN);
(b) connect to a plurality of edge servers including a first edge server;
(c) preprocess a video asset, wherein:
the preprocessing comprises partial encoding of segments of the video asset that generates corresponding preprocessed video chunks;
the partial encoding includes performing discrete cosine transform (DCT) functions to generate the preprocessed video chunks; and
the partial encoding does not include quantization processing;
(d) store the preprocessed video chunks; and
(e) provide one or more preprocessed video chunks to the first edge server.

20. The origin server of claim 19, wherein the origin server provides the one or more preprocessed video chunks to the first edge server in response to a request from a user device connected to the first edge server for the corresponding segments of the video asset.

21. The method of claim 1, wherein
the final processing does not include performing DCT functions.

* * * * *